US011986788B2

(12) United States Patent
Blau et al.

(10) Patent No.: US 11,986,788 B2
(45) Date of Patent: May 21, 2024

(54) MIXING DEVICE HAVING A TWO-PART CLOSURE LID

(71) Applicant: Maschinenfabrik Gustav Eirich GmbH & Co. KG, Hardheim (DE)

(72) Inventors: Simon Blau, Höpfingen (DE); Clemens Schmitt, Walldürn-Altheim (DE)

(73) Assignee: Maschinenfabrik Gustav Eirich GmbH & Co. KG, Hardheim (DE)

( * ) Notice: Subject to any disclaimer, the term of this patent is extended or adjusted under 35 U.S.C. 154(b) by 923 days.

(21) Appl. No.: 16/980,110

(22) PCT Filed: Mar. 8, 2019

(86) PCT No.: PCT/EP2019/055871
§ 371 (c)(1),
(2) Date: Sep. 11, 2020

(87) PCT Pub. No.: WO2019/175054
PCT Pub. Date: Sep. 19, 2019

(65) Prior Publication Data
US 2021/0245122 A1 Aug. 12, 2021

(30) Foreign Application Priority Data
Mar. 16, 2018 (DE) ..................... 10 2018 106 192.7

(51) Int. Cl.
*B01F 35/45* (2022.01)
*B01F 27/90* (2022.01)
(Continued)

(52) U.S. Cl.
CPC ............ *B01F 35/451* (2022.01); *B01F 27/90* (2022.01); *B01F 29/835* (2022.01);
(Continued)

(58) Field of Classification Search
CPC .... B01F 35/451; B01F 35/454; B01F 35/452; B01F 35/7547; B01F 35/751;
(Continued)

(56) References Cited

U.S. PATENT DOCUMENTS 1,625,671 A * 4/1927 Metcalf .................... B61D 7/18 105/283
2,949,275 A * 8/1960 Pro ......................... F16K 13/00 222/452
(Continued)

FOREIGN PATENT DOCUMENTS

CN 201070580 Y 6/2008
CN 102861528 A 1/2013
(Continued)

OTHER PUBLICATIONS

English Translation of KR19980074296 obtained on Aug. 22, 2023 from <https://patents.google.com/> (Year: 2023).*
(Continued)

*Primary Examiner* — Marc C Howell
*Assistant Examiner* — Patrick M McCarty
(74) *Attorney, Agent, or Firm* — Faegre Drinker Biddle & Reath LLP

(57) ABSTRACT

A mixing device includes a container for receiving mixing material, with an emptying opening being arranged in the bottom thereof, and a closure cover for closing the emptying opening. The mixing device includes an emptying opening that can be easily and space-savingly opened and closed. The closure cover includes two closure cover portions which can be reciprocated relative to each other between a closed position in which the two closure cover portions are in contact with each other and together form the closure cover and an opened position in which the two closure cover portions are spaced from each other so that an opening is
(Continued)

Figure 1:
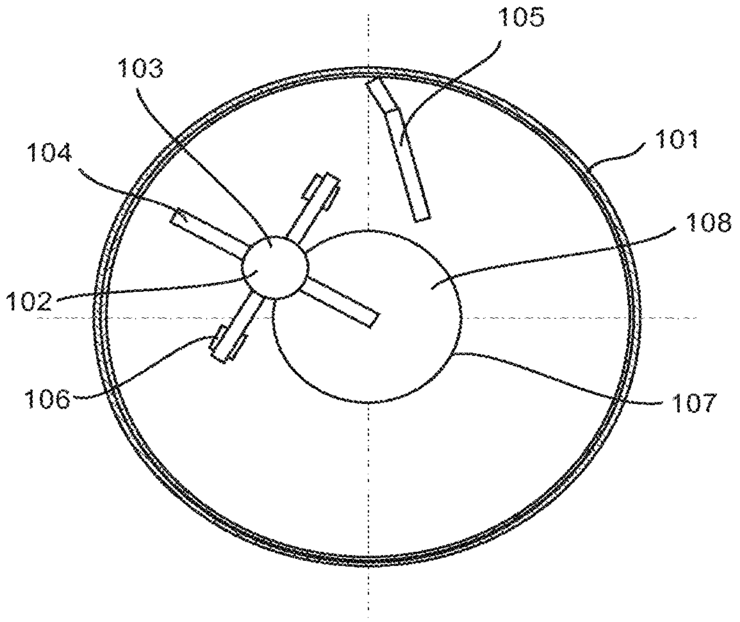
FIG. 1 Prior Art

formed between the two closure cover portions for removal of the mixing material from the container.

15 Claims, 6 Drawing Sheets

(51) Int. Cl.
*B01F 29/83* (2022.01)
*B01F 35/75* (2022.01)
*B08B 3/02* (2006.01)

(52) U.S. Cl.
CPC .......... *B01F 35/452* (2022.01); *B01F 35/751* (2022.01); *B01F 35/7545* (2022.01); *B01F 35/7547* (2022.01); *B08B 3/02* (2013.01)

(58) Field of Classification Search
CPC ...... B65D 90/62; B65D 90/623; B65D 90/64; B65D 90/66; B61D 7/18; B61D 7/26; B61D 7/28
See application file for complete search history.

(56) References Cited

U.S. PATENT DOCUMENTS

| | | | | |
|---|---|---|---|---|
| 3,434,697 | A | 3/1969 | Carlson et al. | |
| 4,516,859 | A * | 5/1985 | Spengler | B01F 35/451 366/77 |
| 4,854,715 | A * | 8/1989 | Eirich | B01F 29/83 366/94 |
| 5,810,327 | A * | 9/1998 | Lutz | F16K 1/2007 251/303 |
| 6,578,743 | B1 * | 6/2003 | Kokeisl | B65D 88/68 222/506 |
| 2011/0249527 | A1 | 10/2011 | Seiler et al. | |
| 2014/0348455 | A1 * | 11/2014 | Itou | F16C 33/7869 384/484 |
| 2019/0389655 | A1 * | 12/2019 | Odet | B65D 90/623 |

FOREIGN PATENT DOCUMENTS

| | | | |
|---|---|---|---|
| CN | 205570267 | U | 9/2016 |
| CN | 106268466 | A | 1/2017 |
| CN | 107233841 | A | 10/2017 |
| CN | 107649036 | A | 2/2018 |
| CN | 207105284 | U | 3/2018 |
| DE | 20 2008 011 606 | U1 | 1/2010 |
| DE | 10 2008 054 842 | A1 | 7/2010 |
| DE | 20 2013 100 812 | U1 | 6/2014 |
| EP | 0 438 772 | A1 | 7/1991 |
| EP | 3124194 | A1 | 2/2017 |
| JP | 61-000832 | U | 1/1986 |
| JP | 2001-157832 | A | 6/2001 |
| JP | 2001-162151 | A | 6/2001 |
| JP | 4759192 | B2 * | 8/2011 |
| KR | 10-1998-0074296 | A | 11/1998 |
| RU | 2476260 | C1 | 2/2013 |
| RU | 2521571 | C2 | 6/2014 |
| SU | 77376 | A1 | 11/1949 |
| WO | WO-2011/128435 | A1 | 10/2011 |

OTHER PUBLICATIONS

English Translation of CN205570267U obtained on Aug. 23, 2023 from <https://worldwide.espacenet.com/> (Year: 2023).*
English Translation of DE202013100812U1 obtained on Aug. 23, 2023 from <https://worldwide.espacenet.com/> (Year: 2023).*
KR Office Action dated Feb. 16, 2023 for KR Application No. 10-2020-7029516, 14 page(s).
Russian Office Action from Russian patent application No. 2020125851, dated Aug. 26, 2021.
Chinese Office Action from Chinese patent application No. 201980019778.8 dated Nov. 30, 2021.

* cited by examiner

MIXING DEVICE HAVING A TWO-PART CLOSURE LID

CROSS-REFERENCE TO PRIOR APPLICATIONS

This application is a § 371 National Stage Application of PCT International Application No. PCT/EP2019/055871 filed Mar. 8, 2019, which claims priority to German Application No. 10 2018 106 192.7 filed on Mar. 16, 2018, both of which are incorporated herein in their entirety.

The present invention concerns a mixing device having a container for receiving mixing material, with an emptying opening being arranged in the bottom thereof, and a closure cover for closing the emptying opening. Such mixing devices are known. They frequently have a container rotatable about a container axis. In addition a rotatable mixing tool is frequently disposed in the interior of the container. In that arrangement the mixing tool is rotatable about a mixer shaft arranged parallel to the axis of rotation of the container, with for example mixing blades being fixed to the mixer shaft.

Figure 2:
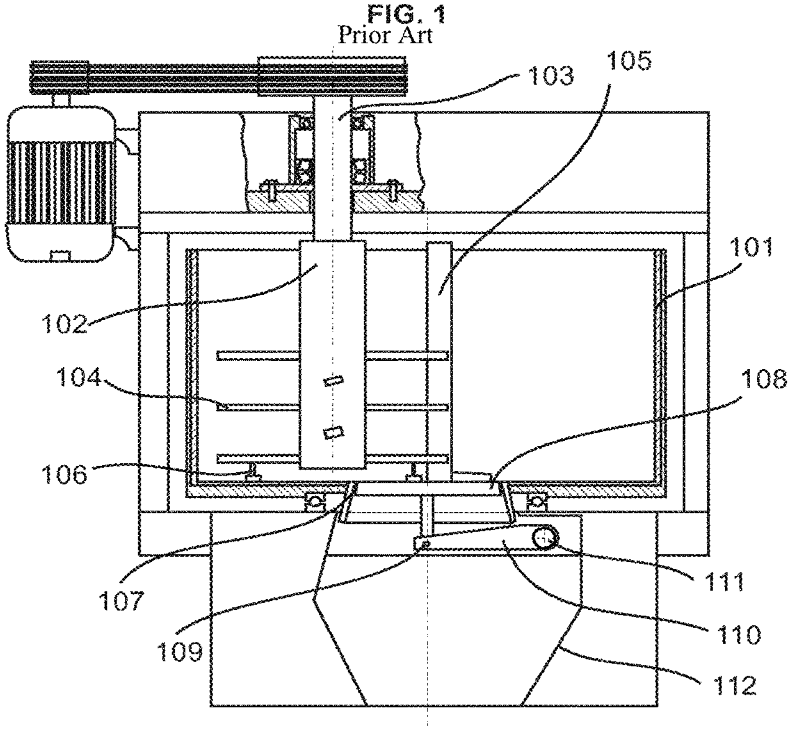
FIG. 2 Prior Art

Such a mixing device is known for example from WO 2011/128435 A1. FIGS. 1 and 2 show a mixing device substantially corresponding to WO 2011/128435 A1. Therein FIG. 1 shows a plan view of a mixing container while FIG. 2 shows a sectional view through the mixing device.

The cylindrical mixing container 101 has a mixing tool 102 which is arranged eccentrically in the mixing container and which is mounted in overhung relationship, on a central shaft 103, with laterally arranged mixing blades 104 and a stationary wall/bottom scraper 105 mounted in overhung relationship vertically from above. Fixed to the lowermost blade plane of the mixing tool 102 are vertically downwardly projecting bottom blades 106 which operate at a small spacing relative to the surface of the container bottom.

The emptying opening 107 is disposed in the centre of the mixing container 101. The emptying opening 107 can be closed with a closure element in the form of a closure cover 108. In the illustrated embodiment the closure cover 108 is connected to a support arm 110 by way of a mounting fork and the mounting trunnion 109 and is thus pivotable about the pivot axis of the mounting trunnion 109. The support arm 110 is mounted rotatably by way of the pivot shaft 111. A return element (not shown) provides that the closure cover 108 assumes a given position relative to the support arm 110 if there are no external forces acting thereon.

When the emptying opening 107 is closed, that is to say the closure cover 108 is positioned within the emptying opening 107, the closure cover 108 ends flush with the bottom of the container. That forms a flat bottom surface, on which the mixing material is moved. That ensures efficient thorough mixing of all the material to be mixed, as above the closure cover there is no dead space which is not reached by the bottom blades 106.

The requirement for the closure cover to end flush with the container bottom gives rise to difficulty in terms of the configuration and guidance of the closure cover.

Basically the closure cover would have to be moved linearly downwardly to open the emptying opening. The consequence of that however would be that, by virtue of the arrangement of the emptying opening in the bottom of the container, the mixing material would flow over all edge surfaces of the closure cover and would possibly even foul the drive of the closure cover. It is however not possible for the closure cover to be pivoted laterally out of the emptying opening by virtue of the substantially cylindrical or frustoconical contact surfaces of the closure cover and the emptying opening.

For that reason the drive of the closure cover that is shown in FIG. 2 allows a pivotal movement both about the axis 111 and also about the axis 109. The known closure cover is complicated and expensive to manufacture and cannot be readily cleaned. By virtue of the rotational movement of the closure cover the closure cover has to have a certain clearance within the emptying opening to be able to be pivoted out of the emptying opening. The gap which is formed as a result means that mixing material constituents can escape from the container even when the emptying opening is closed. In addition the closure cover has to be very thoroughly cleaned after each emptying operation in order to ensure that it can be positioned in the opening again and reliably seals it off. In addition mixing material can collect in the region of the pivot axis 109 which is beneath the closure cover, and impede the pivotal operation. By virtue of the pivotal movement of the closure cover in conjunction with the rotary movement of the mixing container the mixing material as it flows out of the opening will flow out of the mixing container in a parabolic path. As a result it is necessary for the transfer box 112 which is disposed beneath the closure cover to be of a relatively large size, which causes difficulty with subsequent cleaning. In addition the lower discharge cross-section of the transfer box has to be made relatively large to permit a sufficiently steep discharge angle. The large discharge cross-section causes difficulty in terms of receiving the mixing material in downstream-connected containers as they too in turn have to involve large inlet cross-sections.

Finally it is necessary to provide in the discharge box space for the closure cover in the opened position, at which the closure cover impedes as little as possible the mixing material flowing out of the emptying opening. That means that a corresponding amount of space has to be provided for the closure cover.

Taking the described state of the art as the basic starting point the object of the present invention is therefore to provide a mixing device, the emptying opening of which can be opened and closed easily and in space-saving fashion.

According to the invention that object is attained in that the closure cover comprises two closure cover portions which can be reciprocated relative to each other between a closed position in which the two closure cover portions are in contact with each other and together form the closure cover and an opened position in which the two closure cover portions are spaced from each other so that an opening is formed between the two closure cover portions for removal of the mixing material from the container.

The two-part configuration of the closure cover provides that the required space for positioning of the closure cover in the opened position is better distributed so that overall the mixing devices can be of a more compact structure. In addition at no point during the rest or motion phase do the closure cover portions pass upwardly out of the plane of the mixing container bottom so that at no point can a collision occur with the mixing tool or the bottom blades fixed thereto with the closure cover.

In a preferred embodiment both closure cover portions can be pivoted about a pivot axis to reciprocate them between the closed position and the opened position, wherein preferably both closure cover portions are pivotable about the same pivot axis.

The pivotal movement about a pivot axis facilitates motion guidance of the closure cover portions.

In a further preferred embodiment the two closure cover portions each have a contact surface, wherein the two contact surfaces are in contact with each other in the closed position, wherein provided in at least one contact surface and preferably both contact surfaces is a recess in which an elastic sealing element is arranged.

That makes it possible for the emptying opening to be reliably closed in the closed position and discharge of mixing material through a gap formed between the closure cover portions is prevented.

A further preferred embodiment provides that the elastic sealing element is of such a dimension that it projects beyond the contact surface so that it is elastically deformed in the closed position. That measure enhances the sealing integrity of the closure cover. That is advantageous in particular when a reduced pressure is to be maintained in the mixing container during the mixing operation.

A further preferred embodiment provides that the recess is in the form of a groove extending over the entire contact surface. In that case preferably the recess is deeper and/or wider at the ends of the groove, wherein the elastic sealing element is designed to correspond to the recess so that it is thicker and/or deeper at its end regions than in a central region connecting the two end regions. A sealing element extending over the entire contact surface improves sealing integrity. By virtue of the fact that in the regions in which the contact surfaces of the closure cover portions meet the edge surfaces of the emptying opening the sealing element is of a greater volume, sealing integrity is improved precisely in those regions. By virtue of the fact that the recess is of a configuration corresponding thereto a positively locking connection is provided between the sealing element and the closure cover portion. In addition the sealing element can also be glued in the recess in order for example to completely prevent it becoming detached during operation.

A further preferred embodiment provides that the closure cover portions can be moved into a cleaning position which is between the open position and the closed position, wherein there is provided at least one cleaning nozzle so oriented that cleaning agent supplied by way of the cleaning nozzle can be sprayed on to the contact surfaces of the closure cover portions in the cleaning position. By virtue of the two-part structure of the closure cover mixing material passes on to the contact surfaces of the closure cover portions. It is therefore necessary for the contact surfaces to be cleaned at regular intervals. That is best achieved if the closure cover portions are in a position in which the two contact surfaces are spaced from each other, but are not yet arranged in the opened position. That intermediate position is referred to as the cleaning position.

A further preferred embodiment provides that each closure cover portion has a pivotal arm, by way of which the closure cover portion is connected to a drive element arranged on the pivot axis, wherein preferably each closure cover portion has a support arm, by way of which the closure cover portion is supported on the drive element of the other closure cover portion.

This embodiment has the advantage that the pivot axis can be moved into the discharge opening region of the mixing material. In that case the pivot axis does not need to be arranged in the region of the emptying opening. The support arm is therefore helpful for sufficiently stabilising the closure cover portion.

A preferred embodiment provides that each closure cover portion is of a substantially semicircular cross-section so that in the closed position that gives a closure cover of circular cross-section. In principle a configuration involving an exactly semicircular cross-section is possible. In practice however it has been found that the edge surfaces of the closure cover portions are advantageously rounded off in the region of the transition to the contact surface so that the closure cover portions do not have an exactly semicircular cross-sectional shape.

The closure cover portions preferably have an inner surface which with the emptying opening closed is arranged within the container, an outer surface which with the emptying opening closed is arranged outside the container, and an edge surface which with the emptying opening closed is arranged opposite an edge surface of the emptying opening.

In a further preferred embodiment the closure cover portions, the emptying opening and the pivot axis are of such a configuration and arrangement that a point arranged furthest away from the pivot axis on the inner surface or the edge surface of the closure cover portions describes a circle in the pivotal movement, wherein the closure cover portions are arranged within the circle and the edge surfaces of the emptying opening are arranged outside the circle.

By virtue of that measure the closure cover portions only have to be rotated about the pivot axis to close the emptying opening. The emptying opening is of such a configuration and arrangement that the edge surfaces of the emptying opening cannot collide with the closure cover during the pivotal movement.

In principle a gap can remain between the edge surfaces of the closure element and the edge surfaces of the emptying opening even in the closed position of the closure element within the emptying opening, the gap width however should be less than the smallest grain size of the mixing material to be processed, to prevent the mixing material from flowing out of the mixing container in the closed position of the closure element.

A preferred embodiment provides that the emptying opening and the closure cover portions have mutually corresponding edge surfaces which come into contact with each other when the closure element is positioned in the emptying opening.

That measure ensures that no gap remains between the emptying opening and the closure cover in the closed position of the closure cover.

A further preferred embodiment provides that the edge surfaces of the closure cover are of a curved configuration such that they lie on a notional sphere and the centre point of the notional sphere lies on the pivot axis.

Particularly preferably the closure cover ends flush with the bottom so that a flat bottom surface is afforded when the closure cover is positioned in the emptying opening.

Such a configuration of the edge surfaces is similar to the structure of spherical segment valve members. Spherical segment valve members serve as a shut-off member within dosing and feed lines. It will be noted however that in the case of the spherical segment valve members the movable valve members are of a spherical segment shape, that is to say not only the contact surfaces which come into contact with a corresponding valve seat are of a curved configuration, but the entire valve member is in the shape of a spherical cap. Apart from the fact that such a valve member is not to be viewed as a closure cover, it also does not permit a flat arrangement in the container bottom by virtue of the cap shape.

The configuration according to the invention has the advantage that the closure cover can be easily pivoted about the pivot axis to close or open the emptying opening.

A further preferred embodiment provides that the emptying opening and the closure cover portions have mutually corresponding edge surfaces which come into contact with each other when the closure cover portions are in the closed position, wherein the edge surfaces of the closure cover portions are of a curved configuration such that they lie on a notional sphere, wherein the centre point of the notional sphere is on the pivot axis. This embodiment has the advantage that the closure cover portions can be easily rotated about the pivot axis as the mutually corresponding surfaces lie on the surface of a notional sphere. The two-part configuration of the closure cover also ensures that, upon opening of the closure cover, the closure cover does not pass into the interior of the container.

In a further preferred embodiment there is provided at least one abutment element which limits the movement of the closure cover portions in the direction of the closed position so that both closure cover portions bear against the abutment element in the closed position.

Figure 3:
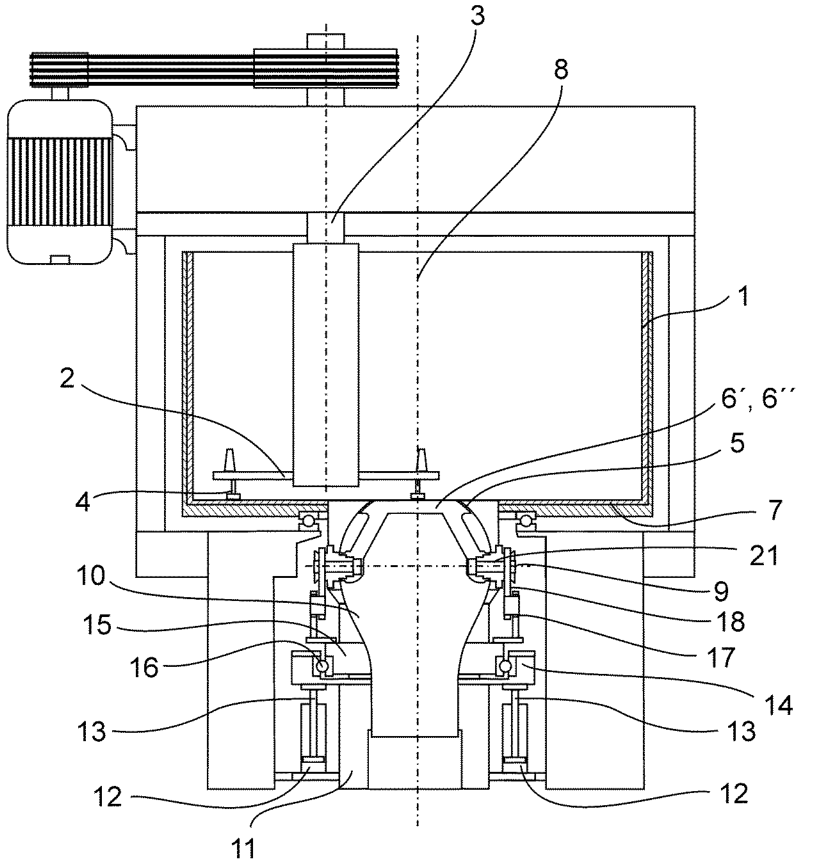
Figure 4:
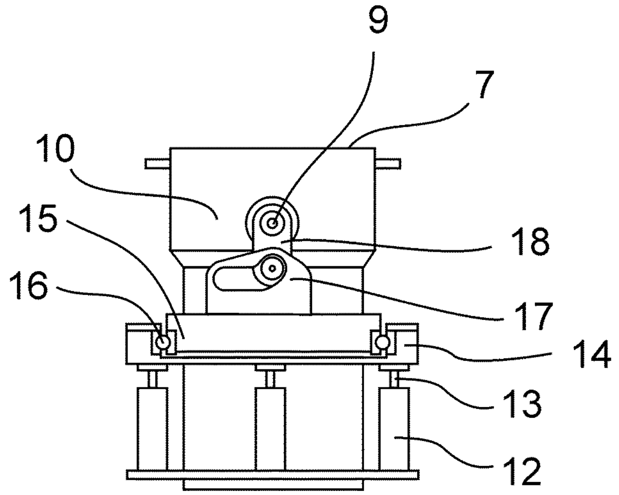
Figure 5:
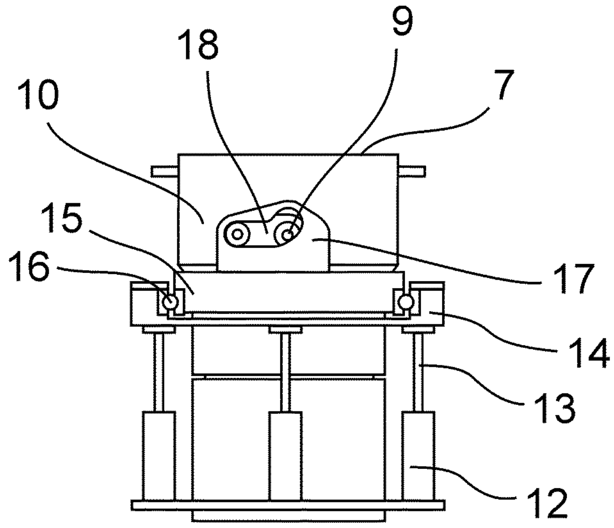
Figure 6:
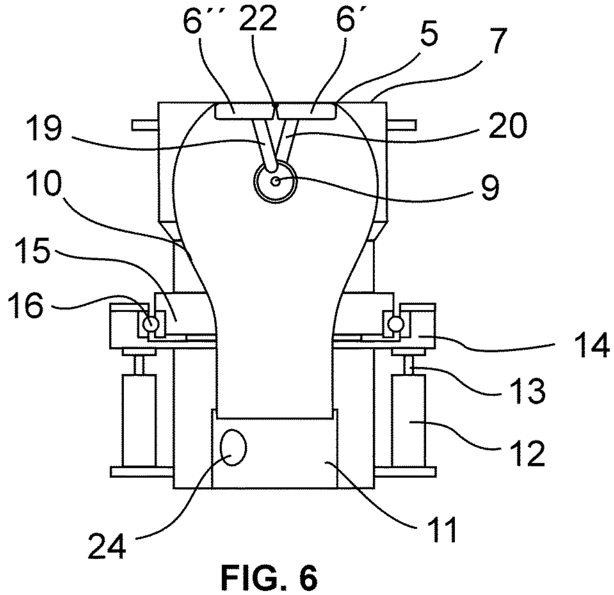
Figure 7:
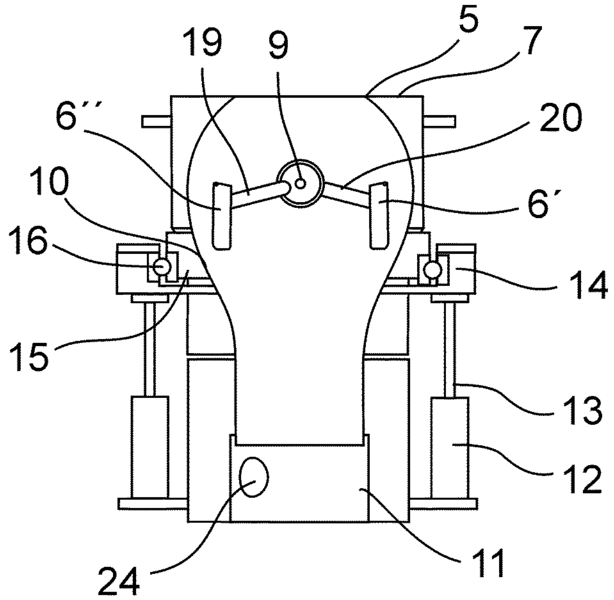
Figure 8:
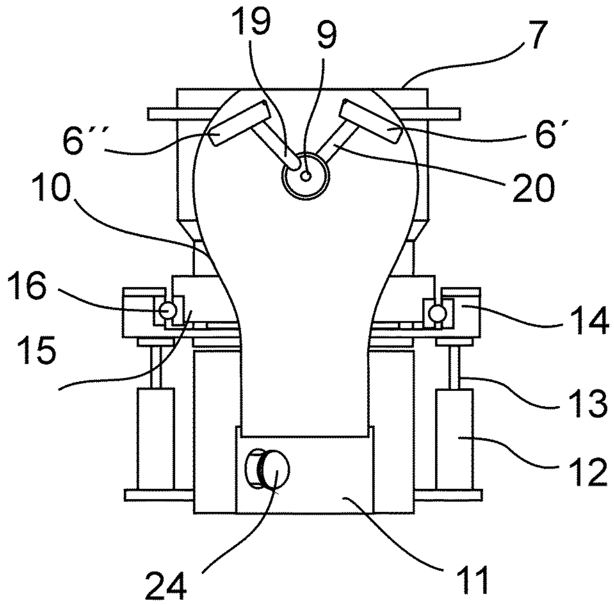
Figure 9:
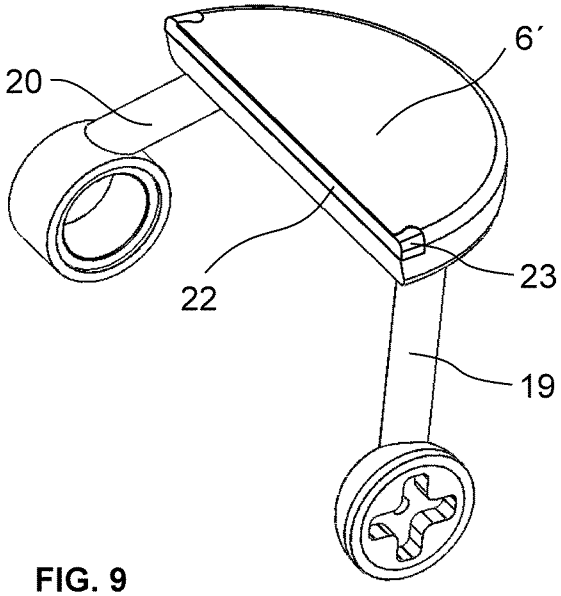
Figure 10:
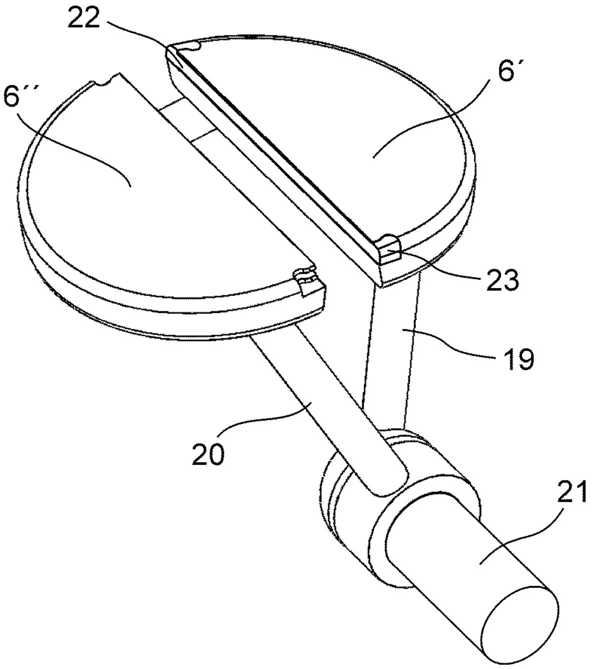
Figure 11:
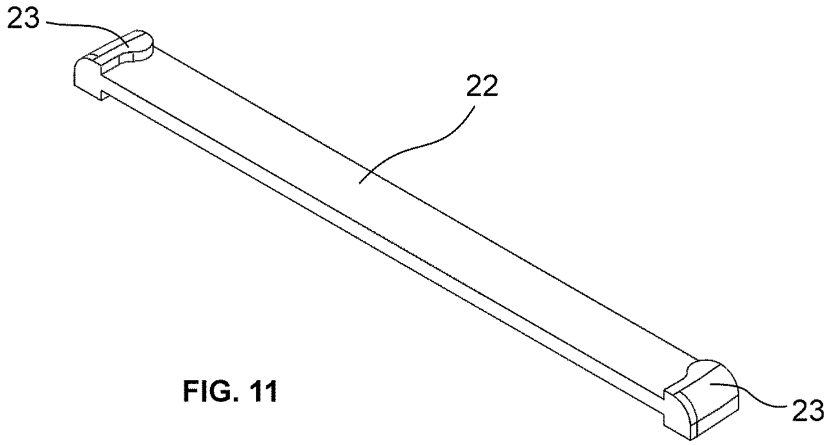

Further advantages, features and possible uses of the present invention will be apparent from the description hereinafter of a preferred embodiment and the accompanying Figures in which:

FIG. 1 shows a plan view of a mixing container of the state of the art,

FIG. 2 shows a lateral section through the mixing device and the mixing container fitted therein as shown in FIG. 1, FIG. 3 shows a lateral section through a mixer with divided closure cover and device for operating the closure cover according to the present invention, FIG. 4 shows a plan view of the closure region of FIG. 3, FIG. 5 shows a second plan view of the closure region of FIGS. 3 and 4, FIGS. 6 and 7 show two lateral sectional views of the closure region of FIGS. 4 and 5 with a multi-part closure cover in the closed and opened state respectively, FIG. 8 shows a modification of FIG. 7 with a closure cover opened in a cleaning position with extended cleaning nozzle, FIG. 9 shows a perspective view of a closure cover portion, FIG. 10 shows a perspective view of a closure cover, comprising two closure cover portions, and FIG. 11 shows a perspective view of a sealing element.

The configuration of the state of the art shown in FIGS. 1 and 2 has already been described above.

FIG. 3 shows a lateral section through a mixer with a divided closure cover of a mixing device according to the invention. The cylindrical mixing container 1 has a mixing tool 2 which is arranged eccentrically in the mixing container and which is supported in overhung relationship on a central mixer shaft 3 as well as a stationary wall/bottom scraper (not shown) mounted vertically in overhung relationship from above. Fixed to the lowermost plane of the mixing tool 2 are vertically downwardly projecting bottom blades 4 which operate at a small spacing relative to the surface of the container bottom.

The emptying opening 5 is in the centre of the mixing container 1. The emptying opening can be closed with the closure element in the form of a closure cover 6', 6". The mixing container bottom 7 can be seen here. As can be seen in particular from FIGS. 6 and 7 arranged in the container bottom 7 is an emptying opening 5 which can be closed by means of a two-part closure cover 6', 6". FIGS. 5 and 7 show a situation in which the closure cover is completely opened. FIGS. 4 and 6 show a situation in which the closure cover is closed. FIG. 8 shows the closure cover in the cleaning position in which the closure cover is partly opened.

The container bottom 7 rotates together with the container about an axis of rotation 8. The two closure cover portions 6' 6" are rotated about a pivot axis 9 for opening and closing the closure cover 6', 6". So that this is possible the emptying opening and the closure cover portions preferably have mutually corresponding edge surfaces curved in such a way that they lie on a notional sphere so that, for opening or closing the emptying opening, the closure cover portions can be pivoted about a pivot axis on which the centre point of the notional sphere lies.

In general disposed in the mixing container arranged above the mixing container bottom 7 is mixing material which, when the closure cover 6', 6" is opened, as shown in FIGS. 5 and 7, falls into the mixing material discharge 10 through the emptying opening. The mixing material discharge 10 is connected to the container bottom so that same rotates with the container. Arranged on the mixing material discharge 10 is a skirt 11 connected to the stationary system. The mixing material discharge 10 and the skirt 11 are rotatable relative to each other by way of a rotary bearing.

A lift device 12, 13 is also arranged connected to the stationary system, for example in the mixer base, in which the corresponding mixer is positioned. In the illustrated example four lift stroke pistons 13 are arranged in the corresponding chambers within the piston housing 12. In per se known manner the fluid chambers formed by the lift pistons 13 can be acted upon with pressure fluid within the piston housing 12 in order to reciprocate the lift piston 13 within the housing 12 between its two extreme positions shown for example in FIGS. 4 and 5 and FIGS. 6 and 7 respectively.

The lift piston 13 is connected to a first lift element portion 14. When the lift device 12, 13 is actuated the lift element portion 14 can be moved upwardly and downwardly together with the list piston 13. The lift element comprises the first lift element 14 and the second lift element 15. The two lift element portions 14, 15 are rotatable relative to each other by way of a rotary bearing 16. As the first lift element 14 is fixed to the lift piston 13, that is arranged in the stationary system, that is to say it does not rotate together with the mixing container. The second lift element portion 15 in turn is connected to the mixing material discharge 10 so that it rotates together with same and the mixing container when the container is driven. The first lift element portion and the second lift element portion are so arranged that they are connected together in positively locking relationship in the direction of the linear movement of the lift device 12, 13, which means that, when the first lift element 14 is moved from the lower position shown in FIG. 4 into the upper position shown in FIG. 5, the second lift element portion 15 is also lifted.

As can be seen in particular from FIGS. 4 and 5 a cam plate 17 is connected to the second lift element portion 15. A lever 18 runs on the cam plate, in turn being connected to the mixing container or the mixing material discharge 10. When now the lift device is actuated to move the lift element from the FIG. 4 position into the FIG. 5 position the lever 18 runs along the cam plate 17 and is rotated in the clockwise direction about the pivot axis 9. As the pivot axis 9 is connected to a closure cover portion the latter is also rotated about the pivot axis 9. It will be seen from FIG. 3 that provided on the opposite side are a further cam plate and a further lever which move at the same time but in opposite relationship, in which respect the other closure cover portion is connected to the upper lever.

FIGS. 6 and 7 show a sectional view of the plan view of FIGS. 4 and 5. Besides the two closure cover portions 6', 6"

a retracted cleaning nozzle 24 in the skirt portion 11 is also shown. FIG. 7 shows the completely opened closure with the closure cover portions 6', 6" in their end position. The cleaning nozzle 24 is retracted in the wall of the skirt 11.

FIG. 8 shows a modification of FIG. 7 with a closure cover opened in a cleaning position, with the cleaning nozzle extended. The closure cover portions 6' and 6" are moved into a partly opened position by means of the partly extended lift device 12, 13 so that there is a gap between the corresponding edge and contact surfaces. To perform cleaning of the edge and contact surfaces a preceding step involves removing the mixing material completely from the mixing container by completely opening the closure cover as shown in FIG. 7. The closure cover portions 6', 6" are then pivoted in such a way that the cleaning position is adopted. While the closure cover portions are being pivoted into the cleaning position a cleaning nozzle 24 disposed in the stationary skirt portion 11 can be extended into the skirt region 11 or the mixing material discharge 10 through which the mixing material flows and the surface and edge and contact surfaces of the closure cover portions 6' and 6" can be cleaned off by spraying a cleaning fluid thereon.

The closure cover portions are shown in FIGS. 9 to 11. FIG. 9 shows a perspective view of a closure cover portion 6'. The closure cover portion 6' is of a substantially semi-circular configuration and is connected to a pivotal arm 19 driven by the pivot shaft 21. Provided on the opposite side is a support arm 20 which is supported on the oppositely disposed pivot axis.

FIG. 10 shows the closure cover comprising two closure cover portions 6', 6". In the illustrated structure both closure cover portions 6', 6" have a recess in which a suitable sealing element 22 is arranged by way of example in the closure cover portions 6'. When the two closure cover portions are moved into their closed position the two sealing elements bear against each other and close the gap between the two closure cover portions 6', 6". The sealing element 22 is of an elastic nature and has a thickened portion at its end regions 23. The recess within the closure cover portions 6', 6" is of a configuration corresponding to the sealing element 22. It is precisely in the corner region of the closure cover elements that a sealing structure is necessary to prevent mixing material from escaping from the container.

In the illustrated embodiment the emptying opening is circular so that the two closure cover portions are substantially semicircular and together form a circle corresponding to the circular shape of the emptying opening.

Alternatively, in the region in which the two closure cover portions 6', 6" meet the emptying opening could differ from the circular shape and could have corresponding inwardly projecting abutment elements. In that case the shape of the closure cover portions 6', 6" should also differ from the circular shape in the region of the abutment elements.

LIST OF REFERENCES

1 mixing container
2 mixing tool
3 mixer shaft
4 bottom blade
5 emptying opening
6', 6" closure cover
7 mixing container bottom
8 axis of rotation
9 pivot axis
10 mixing material discharge
11 skirt
12 piston housing
13 lift device
14 first lift element
15 second lift element
16 rotary bearing
17 cam plate
18 lever
19 pivotal arm
20 support arm
21 pivot shaft
22 sealing element
23 end regions
24 cleaning nozzle
101 mixing container
102 mixing tool
103 central shaft
104 mixing blade
105 wall/bottom scraper
106 bottom blade
107 emptying opening
108 closure cover
109 mounting trunnion
110 carrier arm
111 pivot shaft
112 transfer box

The invention claimed is:

1. A mixing device comprising:

a container for receiving mixing material, with an emptying opening being arranged in the bottom thereof, and a closure cover for closing the emptying opening, wherein the closure cover comprises two closure cover portions which can be reciprocated relative to each other between a closed position in which the two closure cover portions are in contact with each other and together form the closure cover and an opened position in which the two closure cover portions are spaced from each other so that an opening is formed between the two closure cover portions for removal of the mixing material from the container, wherein both closure cover portions can be pivoted about the same pivot axis to reciprocate them between the closed position and the opened position, wherein the closure cover portions have an inner surface which, with the emptying opening closed, is arranged within the container, an outer surface which, with the emptying opening closed, is arranged outside the container, and an edge surface which, with the emptying opening closed, is arranged opposite an edge surface of the emptying opening, and the closure cover portions, the emptying opening and the pivot axis are of such a configuration and arrangement that a point arranged furthest away from the pivot axis on the inner surface or the edge surface of the closure cover portions describes a circle in the pivotal movement, and wherein the closure cover portions are arranged within the circle and the edge surfaces of the emptying opening are arranged outside the circle.

2. The mixing device according to claim 1, wherein the closure cover portions can be moved into a cleaning position which is between the open position and the closed position and there is provided at least one cleaning nozzle so oriented that cleaning agent supplied by way of the cleaning nozzle can be sprayed on to the contact surfaces of the closure cover portions in the cleaning position.

3. The mixing device according to claim 1, wherein each closure cover portion is of a substantially semicircular cross-section.

4. The mixing device according to claim 1, wherein the closure cover ends flush with the bottom so that a flat bottom surface is afforded when the closure cover is positioned in the emptying opening.

5. The mixing device according to claim 1, wherein the container for receiving mixing material is rotatable about a container axis, wherein a rotatable mixing tool is arranged in the interior of the container, wherein the mixing tool has a mixer shaft which is arranged parallel to the axis of rotation of the container and which is arranged spaced from the container axis.

6. The mixing device according to claim 1, wherein each closure cover portion has a pivotal arm, by way of which the closure cover portion is connected to a drive element arranged on the pivot axis.

7. The mixing device according to claim 6, wherein each closure cover portion has a support arm, by way of which the closure cover portion is supported on the drive element of the other closure cover portion.

8. The mixing device according to claim 1, wherein the emptying opening and the closure cover portions have mutually corresponding edge surfaces which come into contact with each other when the closure cover portions are in the closed position.

9. The mixing device according to claim 8, wherein the edge surfaces of the closure cover portions are of a curved configuration such that they lie on a notional sphere, wherein the centre point of the notional sphere is on the pivot axis.

10. The mixing device according to claim 1, wherein there is provided at least one abutment element which limits the movement of the closure cover portions in the direction of the closed position so that both closure cover portions bear against the abutment element in the closed position.

11. The mixing device according to claim 10, wherein at least one abutment element is arranged at the edge surface of the emptying opening.

12. The mixing device according to claim 1, wherein the two closure cover portions each have a contact surface, wherein the two contact surfaces are in contact with each other in the closed position, wherein at least one contact surface has a recess in which an elastic sealing element is arranged.

13. The mixing device according to claim 12, wherein the elastic sealing element is of such a dimension that it projects beyond the contact surface so that it is elastically deformed in the closed position.

14. The mixing device according to claim 12, wherein the recess is in the form of a groove extending over the entire contact surface, wherein the elastic sealing element is designed to correspond to the recess so that it is thicker and/or deeper at its end regions than in a central region connecting the two end regions.

15. The mixing device according to claim 14, wherein the recess is deeper and/or wider at the ends of the groove.

* * * * *